Figure 1:
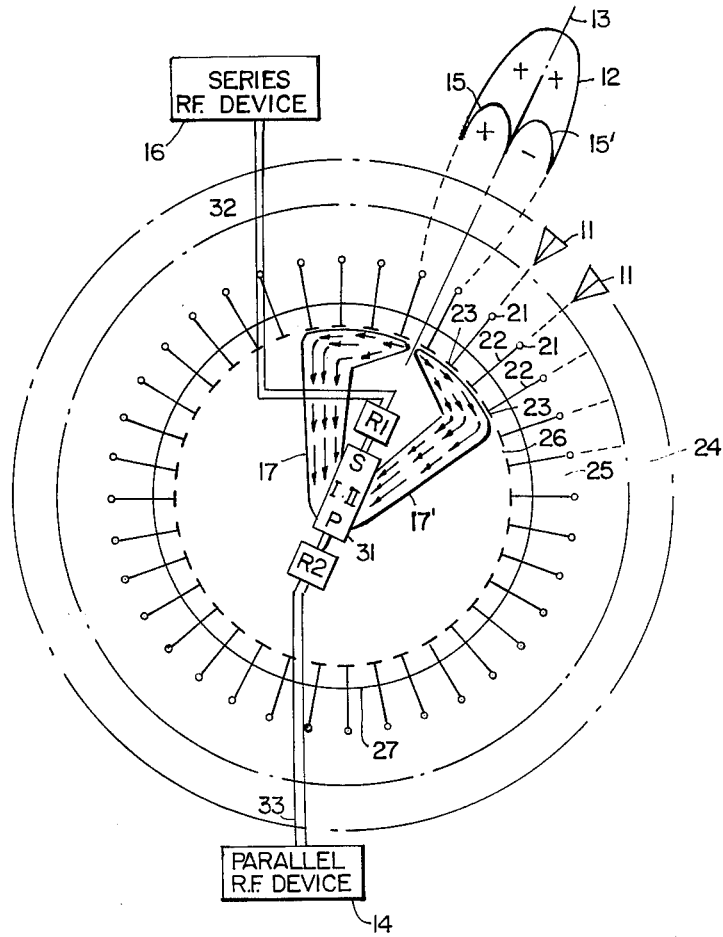

Sept. 21, 1965  A. ALFORD  3,208,067
SELECTIVE TRANSMISSION OF WAVE ENERGY
Filed Nov. 1, 1962

INVENTOR.
Andrew Alford
BY
Ezekiel Wolf, Wolf & Greenfield
ATTORNEYS

3,208,067
SELECTIVE TRANSMISSION OF WAVE ENERGY
Andrew Alford, 299 Atlantic Ave., Boston, Mass.
Filed Nov. 1, 1962, Ser. No. 234,786
6 Claims. (Cl. 343—100)

The present invention relates in general to the selective transmission of wave energy and more particularly concerns a novel wave energy transmission system characterized by both a null and a maximum in radiation characteristic along a selected line of direction. The invention is especially useful in connection with radiant energy tracking systems where it is desired to point a narrow beam at a moving object, such as a satellite, while simultaneously obtaining appropriate control signals for moving the beam into alignment with the object. An exemplary embodiment of a system according to the invention performs both tracking and receiving or transmitting functions with relatively few moving components capable of being positioned rapidly and with relatively little driving power.

The features of the invention will be better appreciated upon considering the problem of tracking a satellite many miles away. Transmitting and receiving telemetry and other data signals requires precise orientation of the maximum of the ground radiation system directivity characteristic upon the moving satellite. To achieve acceptable signal-to-noise ratios usually requires an exceptionally narrow beam width. Achieving a narrow beam width usually requires an antenna system of large physical size, such as the monstrous horns used to track the telstar communications satellite. It is also customary to move the entire physical array of radiating elements when tracking the moving satellite. The size of the moving assembly dictates a requirement for relatively large amounts of driving and positioning power. And the high inertia of the physical system makes rapid control difficult to achieve.

Accordingly, it is an important object of the present invention to provide a system capable of simultaneously providing both a narrow beam for exchanging radiant energy with a device being tracked and a twin beam split by a null along the same line of direction useful in tracking the system.

It is another object of the invention to achieve the preceding object with compact, moveable apparatus requiring relatively little mechanical driving power and capable of positioning the beam along the desired direction rapidly.

According to the invention, a plurality of spaced leads are coupled to a like plurality of spaced terminals. Wave transmission means relatively moveable with respect to the spaced leads exchange energy with the terminals through the respective leads. Hybrid means having a parallel branch, a series branch, and first and second side branches; and characterized by transmitting energy applied to one of the series and parallel feed branches to only the side branches when the branches are terminated in their respective characteristic impedances has its side branches coupled to the wave transmission means to enable the hybrid means to exchange energy with the selected ones of the spaced terminals determined by the contemporary relative position between the wave transmission means and the spaced leads. Series and parallel wave energy utilization devices are respectively coupled to the series and parallel branches of the hybrid means.

In a preferred radiaton system according to the invention, a like plurality of radiating elements are coupled to respective ones of the terminals to provide a radiating system comprising these elements simultaneously having both a twin beam split by a substantal null and a maximum lobe along the same line of direction in its radiation characteristic oriented in accordance with the contemporary relative position between the wave transmission means and the spaced leads.

Figure 2:
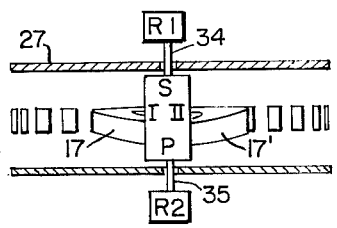

Other features, objects, and advantages of the invention will become apparent from the following specification when read in connection with the accompanying drawing in which:

FIG. 1 is a diagrammatic representation of a radiation system according to the invention; and FIG. 2 is a combined block-pictorial representation of a structure embodying the principles of the invention to show a suitable relationship among the wave transmission means, the hybrid and circularly arranged plates comprising the leads to the respective plurality of terminals.

With reference now to the drawing and more particularly FIG. 1 thereof, there is shown a diagrammatic representation of a system according to the invention in which the antenna system comprising the circularly arranged radiating elements like 11 exhibits a radiation characteristic 12 having a maximum along line of direction 13 to the parallel R.-F. device 14 and a twin beam radiation characteristic 15, 15' split by a null along the line of direction 13 to the series R.-F. device 16 for the orientation of wave transmission device 17, 17' illustrated in the drawing.

Each radiating element 11 is coupled to a respective terminal 21 which in turn is coupled to a respective lead 22 comprising a respective plate 23. In this exemplary embodiment, the radiating elements 11, the terminals 21 and the plates 23 are shown oriented along respective circles 24, 25 and 26.

Each terminal 21, lead 22 and plate 23 is brought out through and insulatedly separated from a conductive casing 27. A hybrid 31 is preferably rotatably supported within the shielding casing 27 so that hybrid 31 and wave transmission means 17, 17' rotate together about the axis passing through the illustrated circles, relative rotation between wave transmission device 17, 17' and the circular array of plates 23 selecting a different group of terminals 21 for exchanging energy with the hybrid 31.

Hybrid 31 includes a series branch coupled through means including rotary joint R1 and transmission line 32 to series R.-F. device 16. Hybrid 31 also includes a parallel branch P coupled through means including rotary joint R2 and transmission line 33 to parallel R.-F. device 14. Side branches I and II exchange energy with branches 17 and 17' of the wave transmission device, generally of the type shown in FIG. 5 of U.S. Patent No. 3,044,063 and described in detail in the copending application of Lindsay Russell entitled Phasing System, Serial No. 766,643, filed October 8, 1958, now Patent No. 3,145,352. The wave transmission device may take a number of different forms and the particular configuration is not a part of this invention. Preferably the hybrid 31 and wave transmission device 17, 17' are maintained in fixed relative relation while the assembly they comprise is relatively moveable with respect to the plates 23.

Hybrid 31 has the following characteristics. Energy applied to one of the series and parallel branches is delivered to both side branches in equal amounts when the respective branches are terminated in their respective characteristic impedance while little or no energy reaches the other of the series and parallel branches. In a preferred form of this hybrid means, energy applied to the parallel branch P reaches the side branches in phase while energy delivered to the series branch S reaches the side branches in phase opposition.

The particular form of hybrid 31 is not a part of this invention and may be, for example, a generally cylindrical hybrid means disclosed in U.S. Patent No. 2,769,146.

Referring to FIG. 2, there is shown a preferred arrangement of a hybrid 31 taking the form of that described in the aforementioned Patent Number 2,769,146 wherein the inputs to the series and parallel branches are located in opposite end walls of the cylinder while the side branches are 180° apart midway between the end faces in the curved wall surrounding the cylinder axis. Transmission lines 34 between series branch S and rotary joint R1 and transmission line 35 between parallel branch P and rotary joint R2 may then be brought out through the top and bottom walls of casing 7 to conventional rotary joints R1 and R2, well-known in the radio frequency art. This particular physical arrangement is especially advantageous since the moveable structure has a relatively low moment of inertia about the axis of rotation, permitting low power drive means (not shown) to position hybrid 31 and wave transmission device 17, 17' rapidly.

Having described the physical arrangement of a suitable embodiment of the invention, it is appropriate to consider the principles of operation. Consider first how pattern 12 is developed. For this purpose it is convenient to assume that parallel R.-F. device is a transmitter providing R.-F. energy to parallel branch P which arrives at side branches I and II in phase. The path lengths between each side branch and the respective plates 23 is such that delays are furnished to the energy delivered to the plates 23 immediately adjacent to wave transmission device 17, 17' so that energy from the associated group of radiating elements 11 arrive in phase along planes perpendicular to the line of direction 13 to produce the pattern 12 having its maximum along the line of direction 13.

In order to consider how the pattern 15, 15' is developed, it is convenient to assume that series R.-F. device 16 is a transmitter providing wave energy to the series branch S which arrives at side branch I in substantial phase opposition to the energy reaching side branch II. Thus, the four plates 23 to the left of line of direction 13 receive energy in phase opposition to the energy delivered to the four plates to the right of line of direction 13 so that a point along line of direction 13 receives energy from the four radiating elements to the left of line 13 of equal magnitude but opposite phase with respect to the energy radiated by the four elements 11 to the right of line of direction 13 with the result that there is a virtual null along line 13 as shown. In addition, the energy in the lobe 15 is furnished primarily by the four radiating elements 11 to the left of line 13 and will be in phase opposition to the energy in lobe 15' furnished primarily by the four elements to the right of line 13. This property is especially advantageous for tracking.

From the theory of reciprocity, it will be recognized that the radiation patterns 12 and 15 characterize reception as well as transmission radiation characteristics. Now if the electrical length between parallel branch P and parallel R.-F. device 14 and that between series branch S and series R.-F. device 16 are such that energy incident from the left of line of direction 13 reaches parallel R.-F. device 14 and series R.-F. device 16 in phase while energy to the right of line of direction 13 reaches parallel R.-F. device 14 and series R.-F. device 16 in phase opposition, it is only necessary to compare the relative phase between the R.-F. energy delivered to parallel R.-F. device 14 and series R.-F. device 16 to determine in what direction the assembly comprising hybrid 31 and wave transmission device 17, 17' should be moved to bring the line of direction 13 into coincidence with the line of direction of the source being tracked.

There has been described a novel system for selectively transmitting radiant energy while rapidly moving the directivity characteristic of an assembly of fixed radiating elements. The system according to the invention exhibits both a null and a maximum along the same line of direction, altering that direction requiring ralatively little driving power. It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. High frequency apparatus comprising,
   a plurality of spaced terminals,
   a like plurality of spaced leads respectively coupled to respective ones of said spaced terminals,
   wave transmission means relatively moveable with respect to said spaced leads for exchanging energy with said spaced terminals through the respective spaced leads,
   hybrid means having a parallel branch, a series branch and first and second side branches and characterized by transmitting energy applied to one of said series and parallel feed branches to only said side branches when said branches are terminated in their respective characteristic impedances,
   means for coupling said side branches to said wave transmission means to enable said hybrid means to exchange energy with the selected ones of said spaced terminals determined by the contemporary relative position between said wave transmission means and said spaced leads,
   and series and parallel wave energy utilization devices respectively coupled to said series and said parallel branches.

2. High frequency apparatus in accordance with claim 1 wherein said hybrid means is further characterized by the property that when energy of a prescribed frequency is applied to said series branch,
   portions of said energy reach said side branches in phase opposition when said branches are terminated in their respective characteristic impedances.

3. High frequency apparatus in accordance with claim 1 and further comprising,
   a like plurality of radiating elements coupled to respective ones of said terminals to provide a radiating system comprising said elements simultaneously having both a substantial null and maximum lobe along the same line of direction in its radiation characteristic oriented in accordance with said contemporary relative position between said wave transmission means and said spaced leads.

4. High frequency apparatus in accordance with claim 1 wherein said spaced leads terminate upon a circular arc closer to the center of said arc than said terminals,
   said wave transmission means being closer to said center than said circular arc,
   said hybrid means embracing said center.

5. High frequency apparatus in accordance with claim 4 wherein the input to said series branch is on the opposite side of the plane included by said circular arc as the input to said parallel branch,
   said side branches embracing the latter plane.

6. High frequency apparatus in accordance with claim 5 and further comprising means defining a conductive casing having side and end walls surrounding said leads, said wave transmission means and said hybrid means,
    said terminals being exposed through said side walls,
    means for supporting said hybrid means and said wave transmission means in fixed relative relationship,
    first and second rotary joints in respective ones of said end walls displaced along their axis of rotation for providing electrical coupling from outside said casing to said series branch and said parallel branch respectively and rotatably support the assembly comprising said hybrid means and said wave transmission means for angular displacement about said axis,
    said axis passing through said center substantially perpendicular to said plane.

No references cited.

CHESTER L. JUSTUS, *Primary Examiner.*